United States Patent [19]
Hirsch et al.

[11] Patent Number: 5,249,496
[45] Date of Patent: Oct. 5, 1993

[54] INDEXING DETENT OVERRIDE MECHANISM

[75] Inventors: Charles A. Hirsch, Brown Deer; Jeffrey S. Holly, Menomonee Falls, both of Wis.

[73] Assignee: Milwaukee Electric Tool Corporation, Brookfield, Wis.

[21] Appl. No.: 930,150

[22] Filed: Aug. 13, 1992

[51] Int. Cl.⁵ .............................................. B27B 5/24
[52] U.S. Cl. .................... 83/471.3; 83/477.1; 83/490; 83/581
[58] Field of Search ............... 83/471.3, 477.1, 477.2, 83/473, 490, 581, 564

[56] References Cited

U.S. PATENT DOCUMENTS

| | | | |
|---|---|---|---|
| 3,487,863 | 1/1970 | Buckley | 83/581 X |
| 3,821,918 | 7/1974 | Niehaus et al. | 83/471.3 |
| 3,948,136 | 4/1976 | Gutowski et al. | 83/581 X |
| 3,998,121 | 12/1976 | Bennett | 83/471.3 |
| 4,011,782 | 3/1977 | Clark et al. | 83/471.3 |
| 4,152,961 | 5/1979 | Batson | 83/471.3 |
| 4,559,857 | 12/1985 | Grossmann et al. | 83/471.3 |
| 5,042,348 | 8/1991 | Brundage et al. | 83/471.3 |

Primary Examiner—Frank T. Yost
Assistant Examiner—Rinaldi Rada
Attorney, Agent, or Firm—Michael, Best & Friedrich

[57] ABSTRACT

A motorized miter saw includes a base having a turntable mounted thereon for rotation about a vertical axis, a cutting unit having a mounting apparatus for securing the cutting unit on the turntable for movement to non-cutting and cutting positions relative to the turntable, and an indexing apparatus for releasably securing the turntable in predetermined positions of angular adjustment. The saw also includes a detent receiving recess at each predetermined position, a detent alignable by rotation of the turntable with any one of the recesses and a detent biasing member constantly biasing the detent into the specific recess which it is aligned. The indexing apparatus also includes a detent override apparatus selectively positionable to withdraw the detent form the recess and free the turntable for micro angular adjustment relative to any predetermined position, a latch for releasably securing the detent override apparatus in the detent withdrawal position, and a lock for releasably securing the turntable in any selected position of micro angular adjustment.

5 Claims, 3 Drawing Sheets

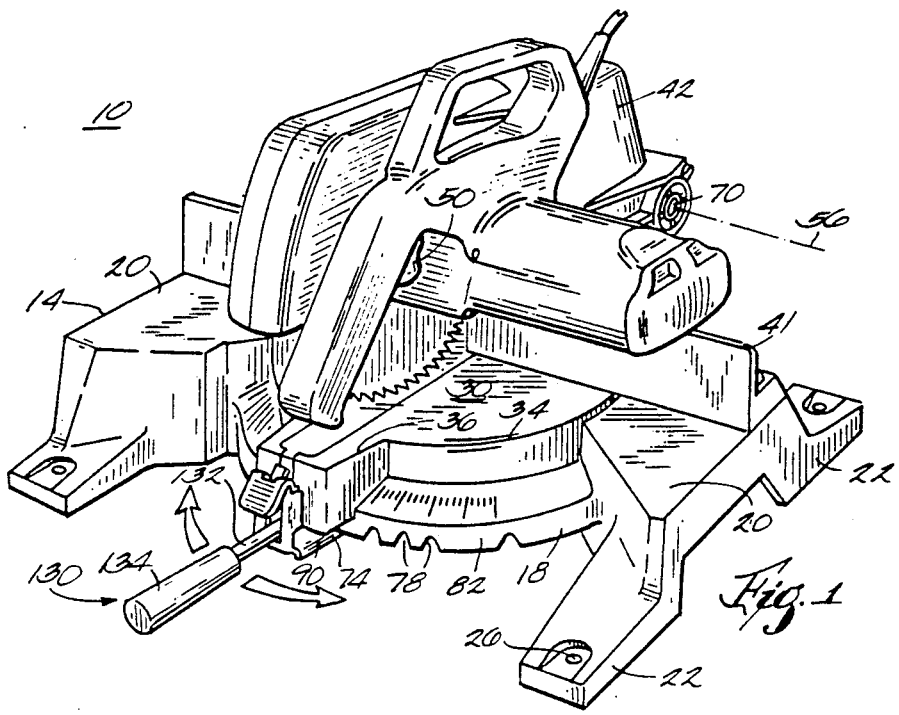
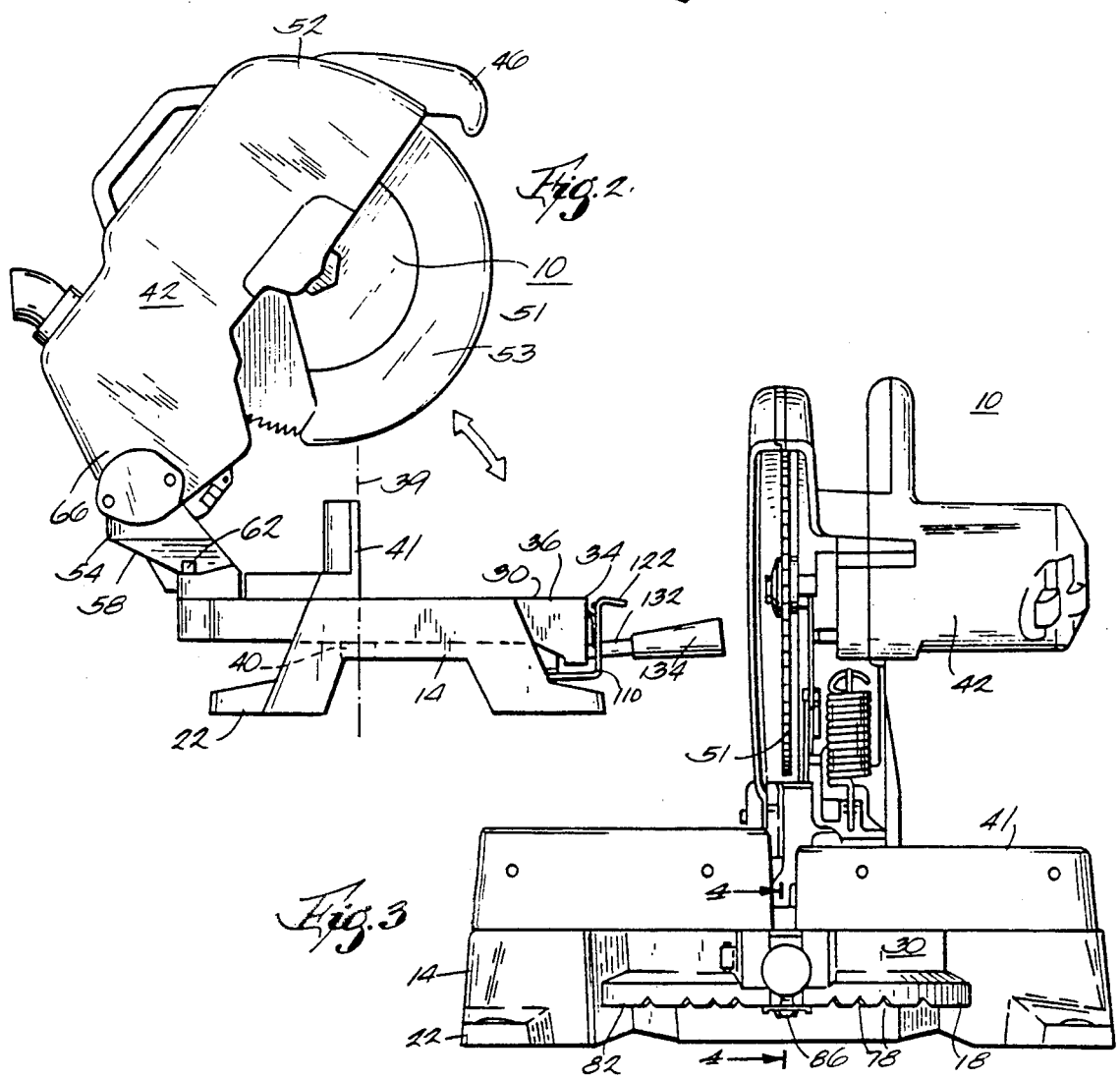

INDEXING DETENT OVERRIDE MECHANISM

BACKGROUND OF THE INVENTION

The invention relates to a power miter saw for use in making controlled angular cuts in a work piece. More particularly, the invention relates to a detent mechanism for quickly and accurately setting the saw to any one of a plurality of indexed angles and for overriding the detent mechanism in order to allow for micro-adjustment of the indexed angle.

Miter saws have been used in carpentry, cabinet-making, and other crafts to create angular cuts in a work piece. Typically, the miter saw has a rotatable turntable on which the saw is mounted. The turntable is rotated to place the saw at a desired angular setting relative to the work piece. A detent mechanism comprising an indexing detent and a series of detent receiving recesses, is provided which operates to lock the rotatable turntable at frequently used angles which will be termed preset angles. Detent recesses are provided at these preset angles which typically are at 15, 30, 45, 60, 75, and 90 degrees. The detent is constantly biased, via some biasing means, so that it will be urged into the detent recess with which it is aligned. The biasing means provides enough force to automatically center and then hold the turntable at the precise preset angle.

While providing an indexing detent is generally desirable, the tendency of the detent to seat in the predetermined indexing detent recess can pose problems. For example, very often the angle required to fit a perfect joint for a chair rail in the corner of a room is not exactly 45 degrees. It may be 44½ degrees or 45½ degrees. An attempt to make a ½ degree adjustment away from a preset angle on a miter saw having a conventional indexing detent mechanism is difficult. During such an attempt, the operator would typically rotate the turntable slightly and force the detent from a fully seated position in the detent receiving recess. However, the detent would not be completely out of the recess because only a small adjustment is being made. In this situation, the spring biased action of the mechanism will tend to force the detent back from its micro-adjust position to the preset angle position thereby allowing the detent to once again, seat solidly in the detent recess provided for that preset angle.

Thus, it is desirable to provide an override mechanism which can override the indexing detent to allow for micro-adjustment relative to the preselected detent angles, and provide a means for locking the turntable in the micro-adjust position.

U.S. Pat. No. 5,042,348, issued to Brundage et al., illustrates a compound miter saw having a rotatable saw unit mounted on a turntable and including an index spring in frictional contact with the supporting frame and turntable. While the index spring provides some frictional resistance against rotational motion of the turntable relative to the supporting frame, there is no detent mechanism or detent override mechanism.

U.S. Pat. No. 4,559,857, issued to Grossmann et al., illustrates a chop saw having a turntable detent mechanism which includes an elongated push rod for selectively releasing the detent mechanism. That chop saw does not include a detent mechanism override nor a means for locking the turntable in a micro-adjust position while the indexing detent is disengaged.

U.S Pat. No. 4,011,782, issued to Clark et al., show a power miter saw having a detent and locking means for securing the turntable in a selected position. However, that miter saw does not include a detent override nor a locking means that may be disabled to free the turntable for micro-adjustment away from a preset angle.

U.S. Pat. No. 3,821,918, issued to Niehaus, illustrates a spring biased ball detent mounted in a blind bore to automatically locate the saw at a preset angle. That the detent mechanism is not selectively engageable nor permanently locked out of position for micro adjustment.

SUMMARY OF THE INVENTION

The invention is embodied in a motorized miter saw that includes a base having a turntable mounted thereon for rotation about a vertical axis. A cutting unit is mounted on the base by a mounting means that secures the cutting unit on the turntable for movement to non-cutting and cutting positions relative to the turntable. An indexing means is provided for releasably securing the turntable in predetermined positions of angular adjustment. The indexing means includes a detent receiving recess at each predetermined position, a detent alignable by rotation of the turntable with any one of the recesses and a detent biasing means constantly biasing the detent into the specific recess with which it is aligned. A detent override is provided that is selectively positionable to withdraw the detent from the recess and to free the turntable for micro angular adjustment relative to any predetermined position. The detent override includes a latch for releasably securing the detent override in the detent withdrawal position. The miter saw embodying the invention further includes a locking means for releasably securing the turntable in any selected position of micro angular adjustment.

The construction of the miter saw and indexing detent override mechanism embodying the invention is an improvement over the prior art indexing detent mechanisms in that it provides an indexing detent mechanism, an apparatus to override the indexing detent mechanism to accommodate micro-adjustment of the turntable relative to the preset angles, and means for locking the turntable in the position of micro-adjustment.

BRIEF DESCRIPTION OF THE DRAWINGS

FIG. 1 is a perspective view of the miter saw including an indexing detent and override mechanism embodying the invention.

FIG. 2 is a side elevational view of the miter saw showing the cutting unit in the non-cutting position.

FIG. 3 is a front elevational view of the miter saw showing the cutting unit in the cutting position.

DETAILED DESCRIPTION OF THE PREFERRED EMBODIMENT

Figure 6:
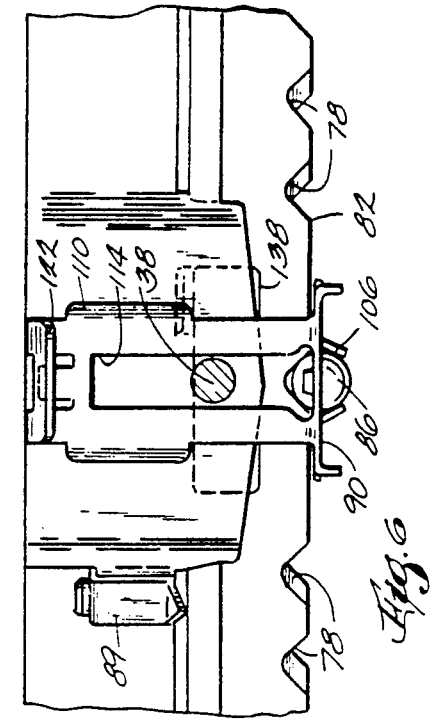
FIG. 6 is an enlarged view of the indexing detent override mechanism taken along line 6—6 in FIG. 5.

FIGS. 1, 2, and 3 illustrate the miter saw 10 having the indexing detent override mechanism embodying the invention. The miter saw generally includes a base 14 having a circular front periphery 18, a work piece support surface 20, and a stable means of support comprising four widely spaced feet 22 each including a bore 26 which could accommodate a bolt (not shown) for securing the saw unit to a workbench or table.

A turntable 30 having a peripheral edge 34 including a peninsular member 36 (FIGS. 1 and 2) having an internally threaded bore 38 (FIG. 4) is mounted on the base 14 for rotational movement about a vertical axis 39 extending longitudinally along a turntable pivot shaft 40. The turntable pivot shaft 40 may simply be unsecured in the base, or, alternatively, the turntable may include a bolt or nut means (not shown) to secure the turntable to the base for rotation about the vertical axis. A work piece fence 41 is bolted to the work piece support surface 20 to provide a support against which a work piece can be held during cutting. In arrangements where the turntable 30 is not secured to the base 14 by other means, the work piece fence also holds the turntable in place on the base.

Also shown in FIGS. 1, 2, and 3, is a cutting unit 42 mounted on the turntable 30. The cutting unit of the preferred embodiment includes a motorized circular saw having a pull arm or actuating handle 46 with a trigger switch 50, a saw blade 51, a fixed blade guard 52 and a moveable blade guard 53. The cutting unit also includes a mounting means 54 best shown in FIG. 2 for securing the cutting unit on the turntable to rotate therewith and to accommodate movement relative to the turntable from a non-cutting position (shown in FIG. 2) to a cutting position (shown in FIG. 1). In the preferred embodiment, the mounting means 54 for mounting the cutting unit on the turntable includes a hinge which provides rotation about a generally horizontal axis 56. The hinge includes a lower hinge portion 58 secured to the base preferably by a pair of bolts 62 threaded through the lower hinge portion 58 into the turntable 30. Also included is an upper hinge portion 66 connected to the lower hinge portion 58 by some form of an axle or pivot pin 70 (best shown in FIG. 1). The upper hinge portion 66 is appropriately secured to the cutting unit. Thus, in operation the cutting unit 42 is provided with two relative planes of motion: the first being rotation about the generally horizontal axis 56 of pin 70 and toward and away from the turntable 30, and the second being rotation about the generally vertical axis 39 relative to the base 14.

The power miter saw embodying the invention includes an indexing means 74 (best shown in FIGS. 4 through 8) for releasably securing the turntable in predetermined positions of angular adjustment i.e., adjustment about the vertical axis 39 and relative to the base 14. The purpose of providing such an indexing means is to allow quick adjustment of the saw to any one of a number of preset angles for the purpose of making controlled predetermined angular cuts in a work piece. While it is desirable at times, to choose almost any angle, there are, for the most part, angles which are so commonly used that predetermined settings are provided for those angles. In that respect, and as shown in FIG. 6, the indexing means shown includes a series of detent receiving recesses 78 at each preset angular position. The recesses reside along the lower edge 82 of the periphery 18 of the base 14. In order to secure the turntable 30 in the preset positions of angular adjustment, a detent 86 is provided that may be aligned with and seated in a detent receiving recess by rotation of the turntable about the vertical axis as will be more fully explained hereinafter.

Figure 7:
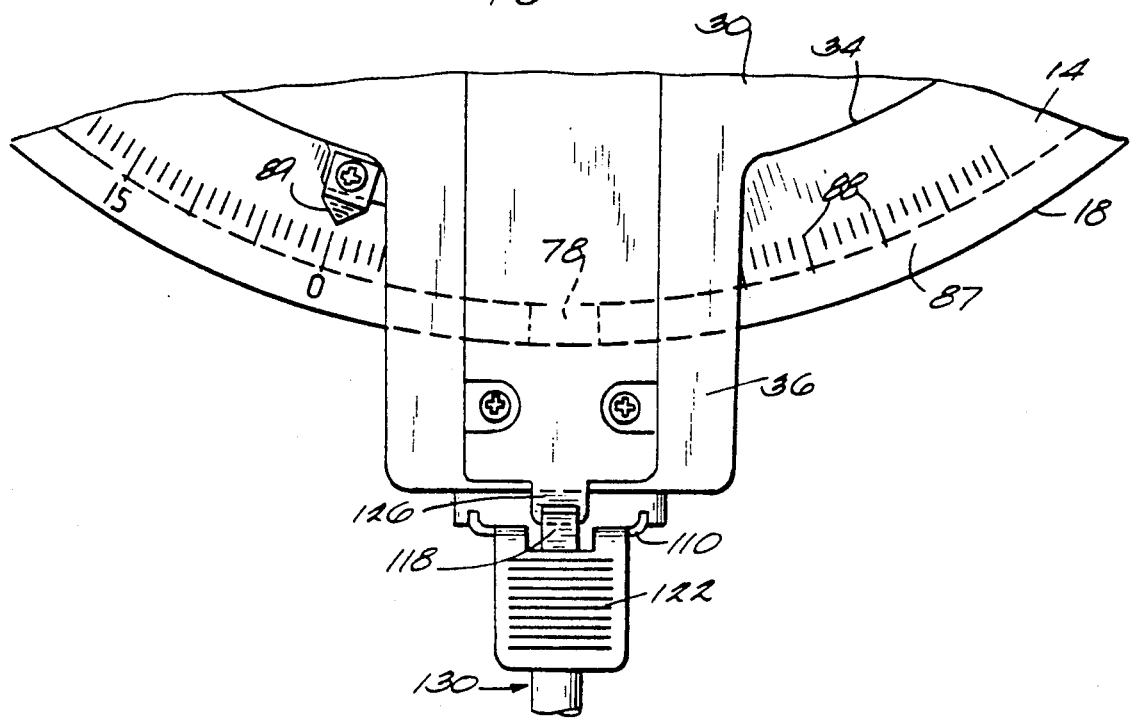
FIG. 7 is a top elevational view of the indexing detent override mechanism.

As shown in FIG. 7, the indexing means also includes a graduated scale 87 on the base 14. The graduated scale 87 has graduated marks 88 denoting the angle of the particular miter cut to be made and a pointer 89 mounted on the rotatable turntable indicating that miter angle to the user.

Figure 4:
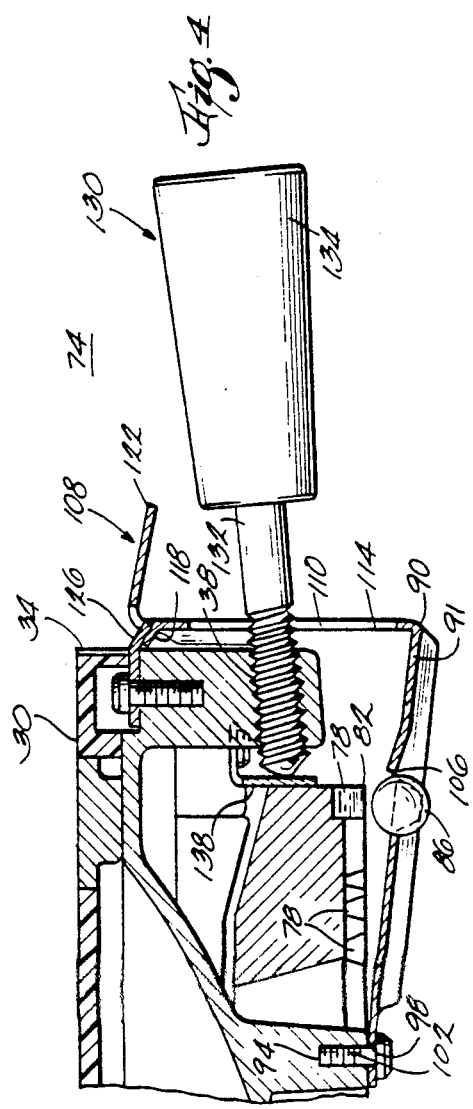
FIG. 4 is an enlarged partial sectional view taken along line 4—4 of FIG. 3 showing the indexing detent override mechanism in its lockout position.
Figure 5:
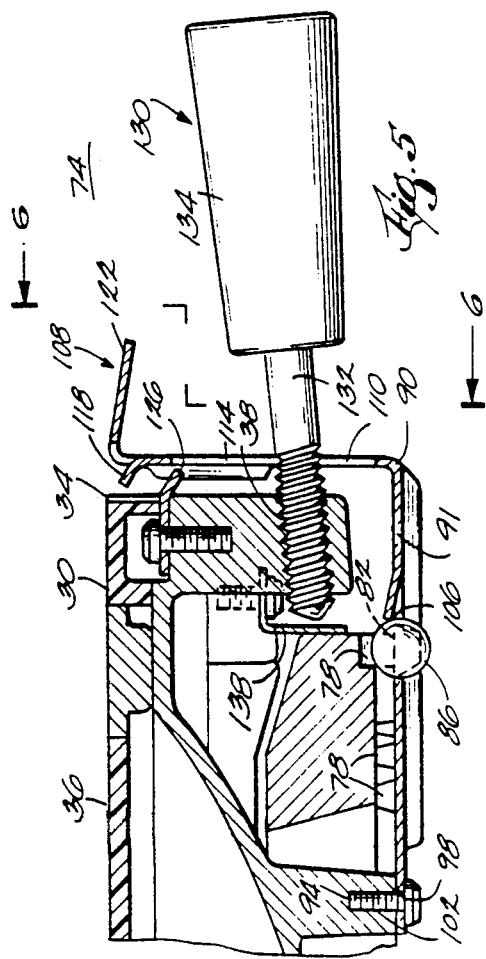
FIG. 5 is an enlarged cut-away view of the indexing detent override mechanism showing the invention in its non-lockout position.

Referring to FIGS. 4 and 5, a detent biasing means 90 is provided to constantly bias the detent 86 into the specific detent receiving recess with which it is aligned. In the preferred form of the invention, the biasing means 90 includes a resilient member in the form of a leaf spring element 91 mounted on the turntable 30 in spaced underlying relation to peninsular member 36 (FIG. 5). The leaf spring is mounted on the turntable by threading a pair of cap screws 94 (only one of which is shown) through the receiving bores 98 in the leaf spring and into threaded bores 102 in the underside of the turntable 30.

The leaf spring element 91 includes a detent receiving saddle 106 for mounting the detent 86 thereon. Preferably, the detent 86 is some form of a rolling element nested on, or in, the saddle 106. The method of mounting the leaf spring element 91 on the lower side of the turntable 30 causes the leaf spring 91 to extend in cantilevered relation therefrom and presents a free end 92. Tightening cap screws 94 deflects the leaf spring element 91 causing it to apply a force normally biasing the ball element 86 nesting in the detent receiving saddle 106 into any detent receiving recess 78 with which it may be aligned at that particular moment.

Figure 8:
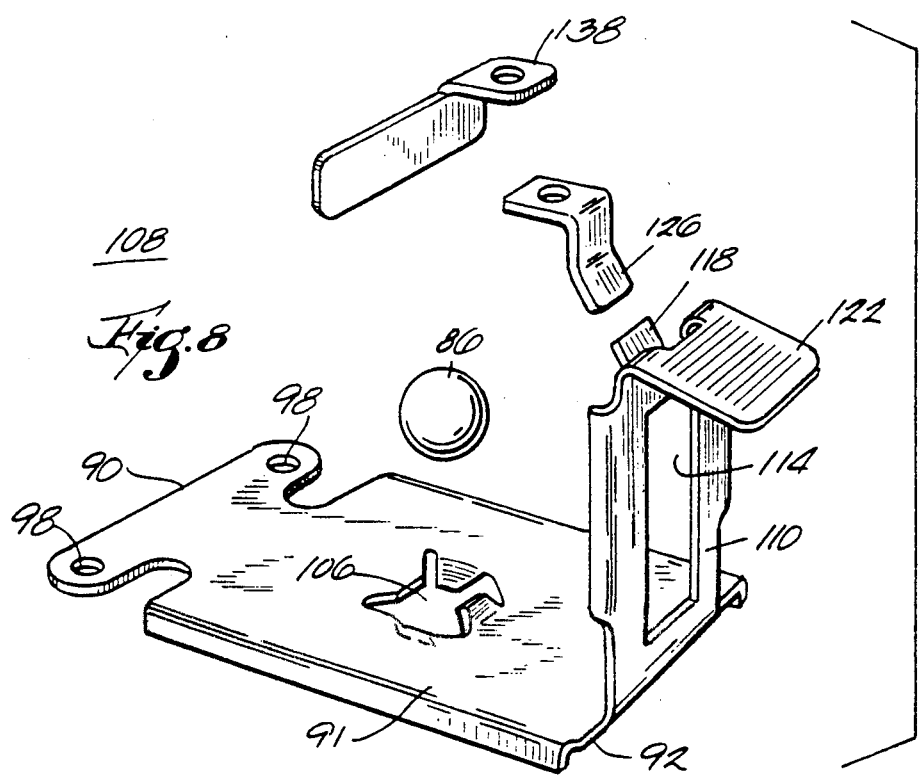
FIG. 8 is an enlarged and exploded view of the functional elements of the indexing detent override mechanism.

As best seen in FIGS. 4 and 8, the invention includes a detent override means 108 for overcoming the biasing force of the leaf spring element. In the preferred form of the invention, the detent override means includes a vertically extending latch arm 110 mounted on and extending vertically from the free end 92 of the leaf spring element 91, and in spaced relation to the outer peripheral border 34 of the turntable 30. The latch arm 110 has an elongated slot 114 aligned with the turntable bore 38 and further includes a latch 118 and a latch actuator 122. The latch actuator 122 is generally horizontal and dimensioned to be conveniently contacted by a user's thumb (not shown). It is operative to move the latch 118 into or out of engagement with a latch receiving means 126 mounted on the outer peripheral border of the turntable.

The latch receiving means of the preferred embodiment is a tab 126 mounted on the periphery 34 of the turntable 30 and orientated so that it may be engaged by the latch 118. The tab 126 is aligned with the latch 118 mounted on the latch arm 110 and provides a means for securing the detent override means in a constant detent withdrawal position to permit unrestricted microangular adjustment of the turntable as will be more fully explained hereinafter.

FIGS. 4 and 5 show a locking means 130 provided for releasably securing the turntable 30 in any selected position of micro-angular adjustment. The locking means includes a threaded rod element 132 extending through the slot 114 of the latch arm 110 and threaded through the bore 38 on the outer peripheral border 34 of the turntable 30. The rod element 132 may be adjusted relative to the turntable and base peripheries (38 and 18, respectively) for selective and locking engagement with the periphery 18 of the base means. The rod element preferably includes a handle 134 to facilitate ease of use. The locking means 130 also includes a locking pad 138 bolted onto the turntable in a position to be contacted by rod 130. The locking pad 138 is a resilient member that allows the force imparted by the rod element 132 to be transmitted to the base 14 without galling the base.

In operation, a user grasps the rod element 132 by the handle 134 with his fingers, placing his thumb on the latch actuator 122 and provides a downward counter-biasing force sufficient to overcome the normal biasing force of the leaf spring element 91. Thus, the leaf spring 91, which normally forces the detent 86 into the detent receiving recess 78 with which it is aligned, is moved away from the detent recess. In this fashion, the detent mechanism is placed in a detent withdrawal position (shown in FIG. 4). This action removes the detent ball element 86 from the detent receiving recess 78, which frees the turntable 30 and allows for micro-angular adjustment of the turntable about the base 14.

Application of force to the latch actuator 122 in the downward direction and toward the base 14, will cause the latch 118 to seat underneath the latch receiving means 126 thereby locking the indexing detent mechanism in the detent withdrawal position. In this position, the turntable 30 may be adjusted to any desired position without the need to provide a continuous force on the latch actuator 122. Once the desired position of adjustment is located, the locking means may be engaged by screwing in the threaded rod element 130 until it securely engages the locking pad 138 and forces the locking pad against the base periphery 118 thereby securing the turntable in the desired position of micro-adjustment.

Various features of the invention are set forth in the following claims.

What is claimed is:

1. A motorized miter saw comprising:
   a base having a turntable mounted thereon for rotation about a vertical axis;
   a cutting unit having a mounting means for securing said cutting unit on said turntable for movement to non-cutting and cutting positions relative to said turntable;
   an indexing means for releasably securing said turntable in predetermined positions of angular adjustment including a detent receiving recess on said base at each predetermined position, a detent alignable by rotation of said turntable with any one of said recesses and a detent biasing means constantly biasing said detent into a detent engaged position in the specific recess with which it is aligned;
   a detent override means selectively positionable to allow movement of said detent from a detent engaged position in said recess to a detent withdrawal position and free said turntable for micro-angular adjustment relative to any predetermined position;
   a latch means for releasably securing said override means in said detent withdrawal position thereby preventing said indexing means from engaging said recess during micro-angular adjustment about said recess; and
   a locking means for releasably securing said turntable in any selected position of micro-angular adjustment.

2. The motorized miter saw according to claim 1 wherein:
   said indexing means includes a resilient member having said detent mounted thereon, said resilient member mounted on said turntable for movement between said detent engaged and withdrawal positions relative to said detent receiving recesses; and
   said latch means is mounted on said resilient member for releasably retaining said resilient member in said detent withdrawal positions.

3. The motorized saw according to claim 2 wherein:
   said resilient member comprises a leaf spring element mounted on said turntable to extend cantilever therefrom and having a free end; and
   said latch means includes a latch arm mounted on said free end of the spring element, a latch mounted on said latch arm, a latch receiving means mounted on said turntable for engagement by said latch and a latch actuator operative to move said latch into or out of engagement with said latch receiving means.

4. The motorized miter saw according to claim 3 wherein:
   said flat spring element includes a detent receiving saddle, and
   said detent comprises a rolling element nested on said saddle and normally biased by said spring element into that detent receiving recess with which it is aligned.

5. The motorized miter saw according to claim 3 wherein:
   said turntable includes an outer peripheral border having an internally threaded bore;
   said latch arm is in spaced relation to said outer peripheral border and has an elongated slot aligned with said bore, and
   said locking means includes a rod element extending through said slot and threaded through said bore for engagement with said base to releasably secure said turntable in any position of adjustment.

* * * * *